United States Patent
Akinaga et al.

(10) Patent No.: US 6,610,421 B2
(45) Date of Patent: Aug. 26, 2003

(54) SPIN ELECTRONIC MATERIAL AND FABRICATION METHOD THEREOF

(75) Inventors: Hiroyuki Akinaga, Tsukuba (JP); Masafumi Shirai, Toyonaka (JP); Takashi Manago, Tsuchiura (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 09/947,513

(22) Filed: Sep. 7, 2001

(65) Prior Publication Data

US 2002/0036281 A1 Mar. 28, 2002

(30) Foreign Application Priority Data

Sep. 8, 2000 (JP) ........................ 2000-273364

(51) Int. Cl.[7] .................. C22C 27/00; H01F 1/04
(52) U.S. Cl. .............. 428/642; 428/655; 428/457; 428/697; 117/106; 148/121; 148/240; 148/300; 148/422; 148/423
(58) Field of Search ............. 428/642, 655, 428/457, 697, 698, 699; 117/952, 953, 954, 106; 148/422, 423, 300, 121, 240

(56) References Cited

U.S. PATENT DOCUMENTS

| | | | | |
|---|---|---|---|---|
| 5,294,287 A | * | 3/1994 | Chang et al. | 117/108 |
| 5,686,351 A | * | 11/1997 | Golding et al. | 148/DIG. 115 |
| 6,132,524 A | | 10/2000 | Akinaga et al. | |
| 6,348,165 B1 | | 2/2002 | Akinaga et al. | |
| 6,413,659 B1 | * | 7/2002 | Rothberg | 257/201 |

FOREIGN PATENT DOCUMENTS

| | | |
|---|---|---|
| JP | 404042898 A * | 2/1992 |
| JP | 9-263495 | 10/1997 |
| JP | 2000-040355 | 2/2000 |
| JP | 2000-156531 | 6/2000 |

OTHER PUBLICATIONS

R. Flederling, et al., Nature, vol. 402, pp. 787–790, "Injection and Detection of a Spin–Polarized Current in a Light–Emitting Diode", Dec. 16, 1999.

Y. Ohno, et al., Nature, vol. 402, pp. 790–792, "Electrical Spin Injection in a Ferromagnetic Semiconductor Heterostructure", Dec. 1999.

S. M. Sze, Physics of Semiconductor Devices, Second Edition, John Wiley & Sons, page 20, "Physics and Properties of Semiconductors—A Resume" No date.

S. Chikazumi, et al., Handbook of Ferromagnets, pp. 500–501, 550–551, 582–583, and 592–593, "Magnetic Material Handbook" No date.

S. Miyanishi, et al., Applied Physics Letters, vol. 68, No. 20, pp. 2890–2892, "Molecular–Beam Epitaxy of $Mn_{1+x}Sb$ Thin Films and Substrate Temperature Dependence of Their Magneto–Optical Properties", May 13, 1996.

S. Miyanishi, et al., Applied Physics Letters, vol. 70, No. 15, pp. 2046–2048, "Epitaxial $Mn_2$ Sb Thin Films Grown by Molecular–Beam Epitaxy on (001) GaAs and Their Magnetic and Magneto–Optical Properties", Apr. 14, 1997.

K.–I. Kobayashi, et al., Nature, vol. 395, No. 6703, pp. 677–680, "Room–Temperature Magnetoresistance in an Oxide Material with an Ordered Double–Perovskite Structure", Oct. 15, 1998.

(List continued on next page.)

Primary Examiner—Deborah Jones
Assistant Examiner—Stephen Stein
(74) Attorney, Agent, or Firm—Oblon, Spivak, McClelland, Maier & Neustadt, P.C.

(57) ABSTRACT

A spin electronic material exhibiting a spin-dependent electronic effect includes zincblende TE-VE, where TE stands for V, Cr or Mn and VE stands for As or Sb.

18 Claims, 5 Drawing Sheets

OTHER PUBLICATIONS

W. J. DeSisto, et al., Applied Physics Letters, vol. 76, No. 25, pp. 3789–3791, "Highly Spin–Polarized Chromium Dioxide Thin Films Prepared by Chemical Vapor Deposition from Chromyl Chloride", Jun. 19, 2000.

H. Ohno, Science, vol. 281, pp. 951–956, "Making Nonmagnetic Semiconductors Ferromagnetic", Aug. 14, 1998.

M. Yuzuri, Journal of the Physical Society of Japan, vol. 15, No. 11, pp. 2007–2012, "On the Magnetic Properties of $Cr_2As$ and $Cu_2Sb$", Nov. 1960.

* cited by examiner

10nm

SPIN ELECTRONIC MATERIAL AND FABRICATION METHOD THEREOF

BACKGROUND OF THE INVENTION

1. Field of the Invention

This invention relates to a spin electronic material that exhibits a spin-dependent electronic effect and to a method of fabricating the material.

2. Description of the Prior Art

Much is heard these days about the Information Technology (IT) revolution. This reflects the progressive realization of an information industry supported by dramatic advances in electronics and other technologies. Electronics technologies that enable transmission, reception, accumulation and, when necessary, processing of huge amounts of data have become available as basic technologies of the IT revolution, while intense R. & D. aimed at achieving still further technology breakthroughs is being pursued on a global scale. Against this backdrop, a new field of electronics that makes positive use of the spin attribute of electrons has come into the spotlight. This field, called spin electronics, has emerged for two primary reasons.

The first is its applicability as a storage technology using ferromagnetic materials that exhibit spin polarization at normal room temperatures. Devices utilizing this technology are already in practical use, including, for example, read heads in hard disk drives and the like that use multilayer structures formed of ferromagnetic metals. In addition, nonvolatile magnetic random access memories that utilize the memory effect exhibited by a spin-polarized ferromagnetic material and are capable of storing data without consuming power are also a subject of vigorous R. & D. (See, for example, ①JP-A-2000-40355 and ②JP-A-2000-156531.)

The second is its applicability to the development of quantum communication using spin-polarized electrons. Quantum computers, quantum communications and related technologies utilizing electron spin characteristics have the potential to render marked changes in encryption techniques and, as such, have become the subject of national scale research projects. The injection of spin-polarized electrons from a magnetic semiconductor into Group III-V semiconductors (e.g., GaAs) of the type used in conventional electronics constitutes one unit operation of such quantum communication. That such injection can occur at low temperatures has been substantiated. (See ①Nature, Vol. 402, 787–790 (1999) and ②Nature, Vol. 402, 790–792 (1999).)

New materials are required to support the development of these emerging technologies. While Fe, Co, Ni and alloys of these metals, which are capable of magnetization at normal room temperatures, are used in storage applications, for example, they have a fatal drawback from the aspect of forming heterostructures with Group III-V semiconductors such as GaAs used as photonic materials. Specifically, these elements are incompatible with the Group III-V semiconductor fabrication process because when incorporated in a Group III-V semiconductor, they become electrical impurities and/or new byproducts lacking spin-polarized electrons. (See ①Physics of semiconductor device, S. M. Sze, John Wiley & Sons, Inc. ISBN 0-471-09837-X and ②Magnetic Material Handbook (Asakura Publishing Co., Ltd.), ISBN 4-254-13004-X.)

One promising spin electronic material, currently a subject of active basic-level research, consists of a heterostructure between a Group III-V semiconductor and a compound ferromagnetic material which is composed of Mn and a Group V element and is not of the zincblende type. (See ①Applied Physics Letters, Vol. 68, No. 20, 2890–2892 (1996) and ②Applied Physics Letters, Vol. 70, No. 15, 2046–2048 (1997).) Non-zincblende type materials readily permit incorporation of Mn into Group III-V semiconductors. Since the Mn therefore forms a shallow impurity level and markedly changes the electrical properties of the Group III-V semiconductor, such materials are also incompatible with the Group III-V semiconductor fabrication process. (See Physics of semiconductor device, S. M. Sze, John Wiley & Sons, Inc. ISBN 0-471-09837-X.

Considerable research is also being focused on perovskite oxides (see ①JP-A-9-263495 and ②Nature, Vol. 395, 677–680 (1998)), Cr oxide films (see Applied Physics Letters, Vol. 76, No. 25, 3789–3791 (1997)) and other substances expected to exhibit high ferromagnetic transition temperatures and higher degree of spin polarization. As these are totally different in crystal structure from the semiconductors used in electronics, however, they have fundamentally poor compatibility with semiconductor electronic materials and are therefore extremely difficult to fabricate on a semiconductor substrate.

A group of substances called "magnetic semiconductors" are also attracting attention as spin electronic materials. The experiments that substantiated the aforesaid injection of spin-polarized electrons were, in fact, conducted using such substances. (See ①Nature, Vol. 402, 787–790 (1999) and ②Nature, Vol. 402, 790–792 (1999).) As the ferromagnetic transition temperature of, for example, the (Ga, Mn)As used in the experiments is at most 120 K, however, use of these substances as practical device materials is substantially impossible. (See Science, Vol. 281, 951–956 (1998).)

The energy level formed when elemental Cr is incorporated in a semiconductor electronic material such as GaAs has been thoroughly researched. (See Physics of semiconductor device, S. M. Sze, John Wiley & Sons, Inc. ISBN 0-471-09837-X.) In particular, Cr is an element commonly used as a dopant for achieving a semi-insulating state in GaAs. While MnP-type CrAs and $Cu_2Sb$-type $Cr_2As$ are well known compounds of Cr and As, both are antiferromagnetic materials found to have no path to application as spin electronic materials. (See Magnetic Material Handbook (Asakura Publishing Co., Ltd.), ISBN 4-254-13004-X.) Expressed in the terminology of physics, the magnetic state of CrAs is properly called "helimagnetism." Although ferromagnetism has been reported in a high-order CrAs compound of unknown crystal structure and composition, the ferromagnetic transition temperature of the compound is below 0° C. (See Journal of the Physics Society of Japan, Vol. 15, No. 11, 2007–2012, 1960.) In other words, As compounds of Cr have received no attention as spin electronic materials.

Development of new substances that not only exhibit superior properties as materials but also have good compatibility with existing semiconductor electronic materials is desired for promoting progress in the field of spin electronics. The properties of these materials should, at the very minimum, include transition temperature in or exceeding the normal room temperature range and high degree of spin polarization. Compatibility with existing semiconductor electronic materials should desirably be such as to enable sharing of common fabrication processes, fabrication of heterostructures and avoidance of the formation of byproducts that cause property degradation during heterostructure fabrication.

This invention was accomplished in light of the foregoing circumstances and has as an object to provide a spin electronic material exhibiting, as material properties, transition temperature in or exceeding the normal room temperature range and high degree of spin polarization, and having compatibility with existing semiconductor electronic materials such as to enable sharing of common fabrication processes, fabrication of heterostructures and avoidance of the formation of byproducts that cause property degradation during heterostructure fabrication. Another object of this invention is to provide a method of fabricating the spin electronic material.

SUMMARY OF THE INVENTION

In order to achieve these objects, the present invention, in a first aspect, provides a spin electronic material exhibiting a spin-dependent electronic effect, which material comprises zincblende TE-VE, where TE stands for V, Cr or Mn and VE stands for As or Sb.

In a second aspect, this invention provides a spin electronic material exhibiting a spin-dependent electronic effect, which material comprises a heterojunction of a zincblende TE-VE, where TE stands for V, Cr or Mn and VE stands for As or Sb, and a zincblende Group III-V semiconductor of GaAs, AlAs, InAs, GaSb, AlSb, InSb or a mixed crystal thereof.

In a third aspect, this invention provides a spin electronic material exhibiting a spin-dependent electronic effect and enabling control of degree of spin polarization, intensity and anisotropy of magnetism, and ferromagnetic transition temperature according to the first or second aspect, wherein the zincblende TE-VE is added with at least one element selected from the group consisting of Li, Be, B, C, N, O, P, Na, Mg, Al, Si, P, S, Cl, K, Ca, Sc, Ti, Fe, Co, Ni, Cu, Zn, Ga, Ge, Se, Br, Rb, Sr, Y, Zr, Nb, Mo, Ru, Rh, Pd, Ag, Cd, In, Sn, Te, I, Cs, Ba, La, Hf, Ta, W, Re, Os, Ir, Pt, Au, Hg, Tl, Pb and Bi.

In a fourth aspect, this invention provides a spin electronic material exhibiting a spin-dependent electronic effect and enabling control of degree of spin polarization, intensity and anisotropy of magnetism, and ferromagnetic transition temperature, which material comprises a mixed crystal of TE-VE, where TE stands for V, Cr or Mn and VE stands for As or Sb, and a different zincblende TE*-VE* represented by $TE_{1-x}TE^*_x\text{-}VE_{1-y}VE^*_y$ (where $0 \leq x \leq 1$, $0 \leq y \leq 1$, TE* is V, Cr or Mn and different from TE, and VE* is As or Sb and different from VE).

In a fifth aspect, this invention provides a spin electronic material exhibiting a spin-dependent electronic effect and enabling control of degree of spin polarization, intensity and anisotropy of magnetism, and ferromagnetic transition temperature which material comprises multilayers of zincblende TE-VE, where TE stands for V, Cr or Mn and VE stands for As or Sb, and a zincblende Group III-V semiconductor of GaAs, AlAs, InAs, GaSb, AlSb, InSb or a mixed crystal thereof represented by $\{[TE\text{-}VE] \times d1/[III\text{-}V] \times d2\} \times N$ (where [III-V] stands for zincblende Group III-V semiconductor, d1 for thickness of the zincblende Te-Ve, d2 for thickness of the semiconductor and N for repetition period).

In a sixth aspect, this invention provides a method of fabricating a spin electronic material exhibiting a spin-dependent electronic effect comprising the steps of:

retaining a substrate of zincblende semiconductor electronic material at a temperature not exceeding 400° C.; and using a non-thermal equilibrium gas phase growth process to deposit TE-VE, where TE stands for V, Cr or Mn and VE stands for As or Sb, simultaneously on the substrate.

In a seventh aspect, this invention provides a method of fabricating a spin electronic material according to the sixth aspect, wherein the substrate is formed of zincblende GaAs.

In an eighth aspect, this invention provides a method of fabricating a spin electronic material according to the sixth aspect, wherein the TE, when deposited, has a molecular beam equivalent pressure set lower than a VE molecular beam equivalent pressure.

As will be understood from the foregoing, this invention is capable of providing a zincblende TE-VE compound whose crystal structure is the same as that of GaAs or other such semiconductor electronic material.

This TE-VE compound has a transition temperature in or exceeding the normal room temperature range and high degree of spin polarization. It also exhibits good compatibility with existing semiconductor electronic materials, whereby it enables sharing of common fabrication processes, fabrication of heterostructures and avoidance of the formation of byproducts that cause property degradation during heterostructure fabrication. As such, it embodies many properties desired in conventional spin electronic materials and therefore can be expected to find extensive use as a basic material for realizing next-generation information technologies (IT).

The above and other objects and features of the present invention will become apparent from the following description made with reference to the accompanying drawings.

BRIEF EXPLANATION OF THE DRAWINGS

FIG. 3 is a graph showing the TM dependence of equilibrium lattice constant in the ferromagnetic, antiferromagnetic and non-magnetic states of zincblende TM-As.

DESCRIPTION OF THE PREFERRED EMBODIMENT

This invention relates to a spin electronic material comprising a zincblende TE-VE compound (where TE is V, Cr, or Mn and VE is As or Sb) whose crystal structure is the same as that of GaAs or other such semiconductor electronic material and to a method of fabricating the material. A TE-VE compound having a crystal structure of zincblende type has heretofore been unknown and was first realized by the present invention.

Moreover, this zincblende TE-VE compound exhibits excellent material properties, including transition temperature in or exceeding the normal room temperature range, high degree of spin polarization, and compatibility with existing semiconductor electronic materials such as to enable sharing of common fabrication processes, fabrication of heterostructures and avoidance of the formation of byproducts that cause property degradation during heterostructure fabrication. As such, it is a revolutionary new substance that embodies many properties desired in conventional spin electronic materials.

Although the spin electronic material of this invention comprises zincblende TE-VE, in order to control the degree of spin polarization, intensity and anisotropy of magnetism, and ferromagnetic transition temperature of the zincblende TE-VE, the material can comprise a mixed crystal of the aforesaid zincblende TE-VE and a different zincblende TE*-VE* represented by $TE_{1-x}TE^*_x\text{-}VE_{1-y}VE^*_y$ (where TE* is V, Cr or Mn and different from TE, VE* is As or Sb and different from VE, $0 \leq x \leq 1$, and $0 \leq y \leq 1$).

Moreover, in order to control the degree of spin polarization, intensity and anisotropy of magnetism, and ferromagnetic transition temperature of the zincblende TB-VE, the spin electronic material can comprise multilayers of zincblende TB-VE and a zincblende Group III-V semiconductor of GaAs, Al As, InAs, GaSb, AlSb, InSb or a mixed crystal thereof represented by $\{[TE\text{-}VE]\times D1/[III\text{-}V]\times d2\}\times N$ (where [III-V] stands for zincblende Group III-V semiconductor, d1 for thickness of the zincblende TE-VE, d2 for thickness of the semiconductor and N for repetition period that is an integer of up to 100.

The properties of CrAs, a typical zincblende TE-VE, determined by theoretical calculation will first be explained using FIGS. 1 to 3, whereafter the method of fabricating the material and the results of measurements obtained for the fabricated material and the material in the course of fabrication will be explained with reference to FIGS. 4 to 9.

The properties of the new substance were first estimated by macroscale calculations based on the first principle.

Figure 1:
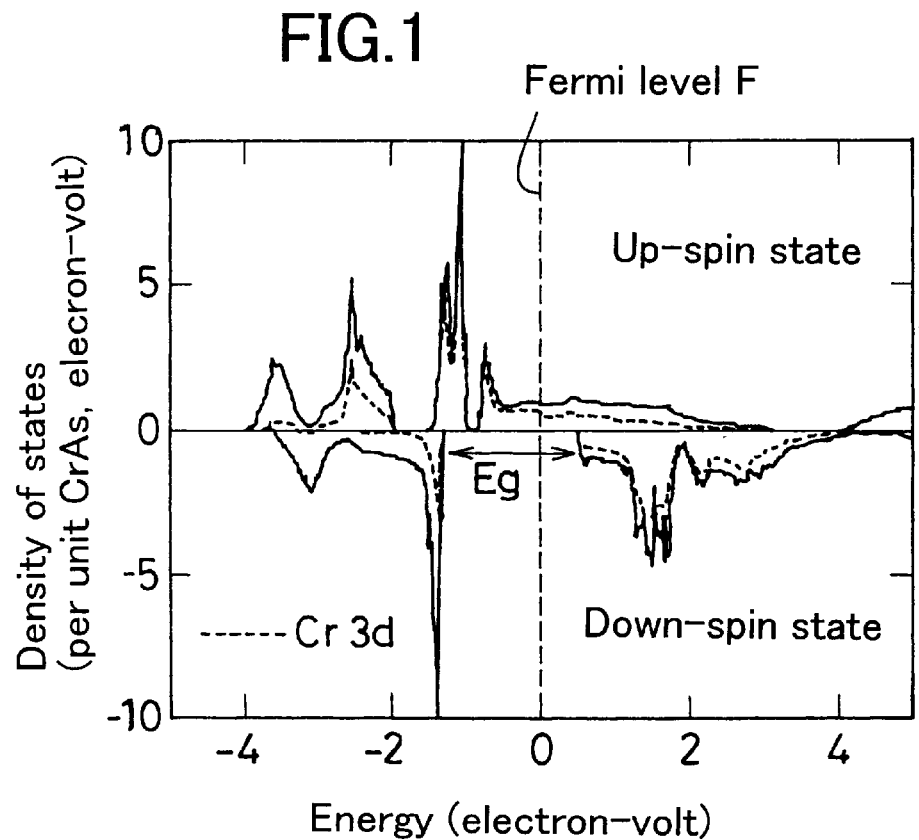
FIG. 1 is a graph showing the density of state of the electronic band structure of zincblende CrAs according to a first principle calculation.

FIG. 1 shows the density of state of the electronic band structure of zincblende CrAs determined by calculations based on the first principle. The density of state of the electronic band structure in the ferromagnetic state is shown separately for the up-and down-spin states. In addition, the energy origin is taken at Fermi level F and the partial density of state for the Cr 3d electronic band structure is represented by broken-line curves.

The first-principle electron state calculations were done using the full potential linearized augmented plane wave (FLAPW) method. As this method utilizes no approximation whatsoever with respect to single electron potential in the crystal, it enables accurate description of the anisotropy of the interatomic bonds characteristic of the zincblende compound.

As shown in FIG. 1, in the minority-spin (down-spin) state the Fermi level (highest filled electron energy level) F is located in the energy gap Eg, i.e., the zincblende CrAs is in a semiconductor-like state. In contrast, in the majority-spin (up-spin) state the density of state is continuous in the vicinity of Fermi level F, i.e., the zincblende CrAs is in a metallic electron state. In other words, calculations of the density of state of the electronic band structure demonstrate that in its ferromagnetic state the zincblende CrAs is in a half-metallic state in which electrons in the vicinity of Fermi level F are totally spin polarized. Thus, in the ferromagnetic state of the zincblende CrAs, all electrons contributing to electric conduction are spin polarized insofar as they are not affected by spin inversion scattering caused by magnetic impurities or the like. This means that the degree of spin polarization of the zincblende CrAs is 100%, as compared with a degree of spin polarization of around 30% for ordinary ferromagnetic materials.

Figure 2:
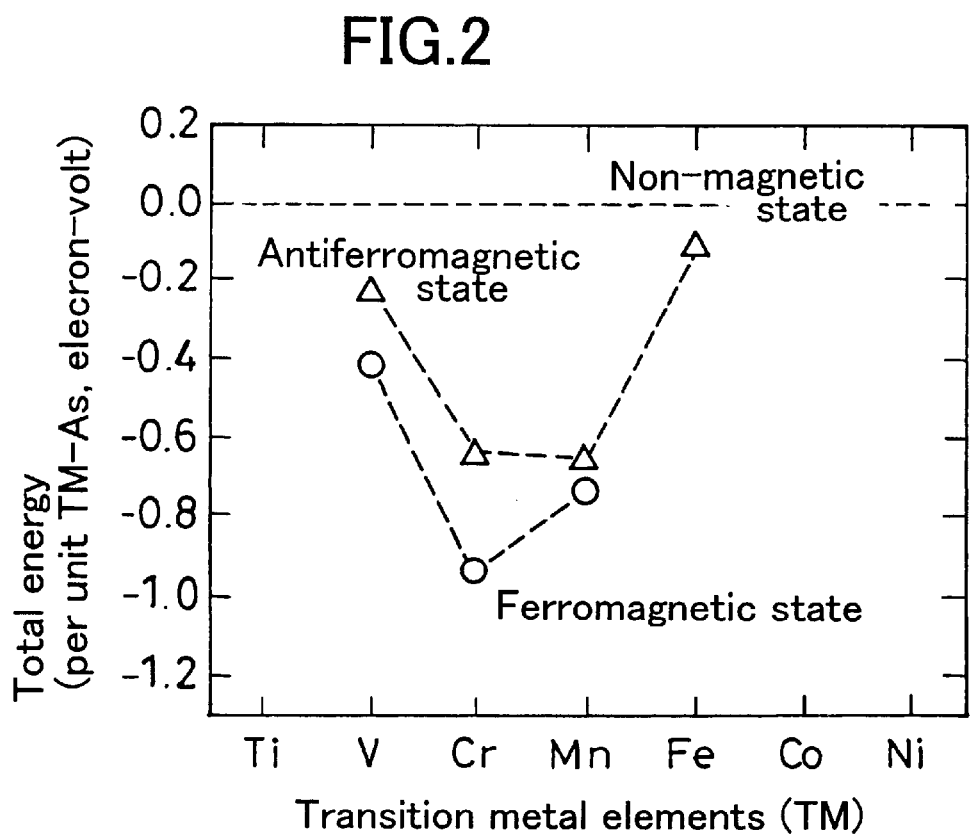
FIG. 2 is a graph showing the TM dependence of zincblende TM-As compound energy.

FIG. 2 is a graph showing the TM dependence of zincblende TM-As compound energy. TM represents various transition metal elements (Ti, V, Cr, Mn, Fe, Co and Ni). The aforesaid first-principle calculations can also be made with respect to strongly localized electron orbits as typified by the transition metal TM 3d orbit. FIG. 2 shows the calculated total energy of the zincblende TM-As crystal for each of the non-magnetic, ferromagnetic and antiferromagnetic states. The total energy in the magnetic order (ferromagnetic or antiferromagnetic) state of the zincblende TM-As is shown with reference to the total energy in the non-magnetic state of the individual substances. In other words, a standard for judging the energy gain (stability) in the magnetic order states of each substance is imparted.

It was found that the ferromagnetic state of the zincblende CrAs is lower in total energy and higher in stability than in the non-magnetic and antiferromagnetic states. It was further discovered that the ferromagnetic state stability of zincblende CrAs was superior to that of any of the other zincblende TM-As compounds.

First-principle calculations from FIG. 2 showed that zincblende substances wherein TM is a TE among V, Cr and Mn have stable ferromagnetic states and are promising spin electronic materials.

Further first-principle calculations showed that when TM in zincblende TM-VE is a TE among V, Cr, and Mn, the compound exhibits similar stability and is a promising spin electronic material not only when VE is As but also when it is Sb.

Figure 3:
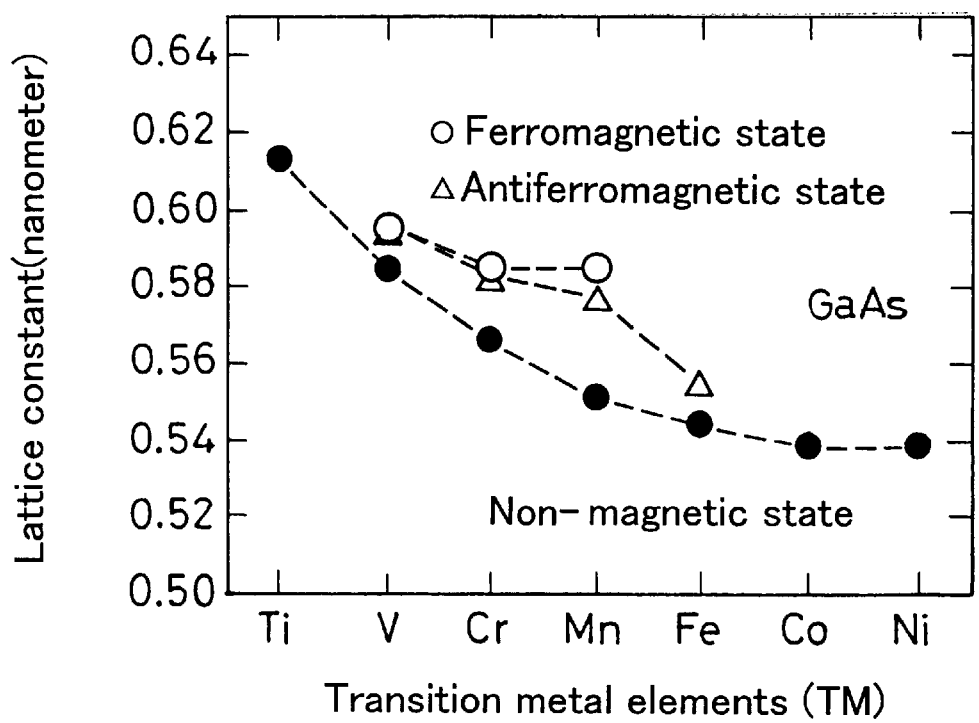

FIG. 3 is a graph showing the TM dependence of equilibrium lattice constant in the different magnetic states of zincblende TM-As. Among the lattice constants when TM is Cr (i.e., the lattice constants of zincblende CrAs), that in the non-magnetic state substantially coincides with that of the GaAs used as the substrate (0.565 nm). In the non-magnetic state, zincblende CrAs therefore has good compatibility with GaAs. In the ferromagnetic state, zincblende CrAs has a larger lattice constant that in the non-magnetic state owing to volumetric expansion caused by the magnetic volume effect. Still lattice matching with GaAs is well preserved and good.

Despite the different lattice constants of different zincblende TE-VEs, lattice matching with the substrate can nevertheless be achieved by selecting among zincblende Group III-V semiconductor substrates composed of GaAs, AlAs, InAs, GaSb, AlSb, InSb and mixed crystals thereof A method of fabricating CrAs, one example of a zincblende TE-VE, will now be explained. A zincblende semiconductor electronic material is used as the substrate for fabricating zincblende CrAs. For example, a zincblende Group III-V semiconductor composed of GaAs, AlAs, InAs or a mixed crystal thereof is used. When such a zincblende semiconductor is used as the substrate and zincblende CrAs is grown on the substrate by the non-thermal equilibrium gas phase growth process, the deposited Cr and As inherit the symmetry of its crystal structure. The non-thermal equilibrium gas phase growth process can be the molecular beam epitaxial process or, alternatively, any of various other processes such as the chemical vapor deposition (CVD) process, sputtering process or ablation process. Moreover, the thin film of this invention has very high compatibility with existing electronic materials in such aspects as, for example, being able to share common production processes. This is because it can be fabricated at a temperature lower than that used to fabricate semiconductor electronic materials, and also because Cr is an element used extensively in conventional semiconductor electronics.

When GaAs (001) is used as the substrate, it is best to utilize a GaAs (001) substrate with a cleaned surface fabricated at 500–650° C., preferably 580–620° C. After fabrication of the cleaned surface, the substrate temperature for effecting growth of the zincblende CrAs must be between room temperature and 400° C., preferably 200–300° C. When the molecular beam epitaxial process is selected as the non-thermal equilibrium gas phase growth process, the beam equivalent pressure of the Cr and $As_4$ molecular beams of the nude ion gauge at the substrate position should preferably be set to make the Cr molecular beam equivalent pressure lower than the $As_4$ molecular beam equivalent pressure so that As is excessive. This enables prevention of the As deficiency that occurs when the As vapor pressure is markedly higher than the Cr vapor pressure.

The zincblende CrAs can be controlled in the degree of its spin polarization and the intensity and anisotropy of its magnetism, and can also be adjusted in ferromagnetic transition temperature by addition of at least one element selected from the group consisting of Li, Be, B, C, N, O, P, Na, Mg, Al, Si, P, S, Cl, K, Ca, Sc, Ti, Fe, Co, Ni, Cu, Zn, Ga, Ge, Se, Br, Rb, Sr, Y, Zr, Nb, Mo, Ru, Rh, Pd, Ag, Cd, In, Sn, Te, I, Cs, Ba, La, Hf, Ta, W, Re, Os, Ir, Pt, Au, Hg, Tl, Pb and Bi.

The surface of the zincblende CrAs can, as required, be provided with a semiconductor heterostructure or an anti-oxidizing and insulating film of silicon nitride, silicon oxide or the like. The crystal structure of the zincblende CrAs can be evaluated, for example, by observation with a transmission electron microscope or scanning tunneling microscope or by X-ray diffraction analysis.

Figure 4:
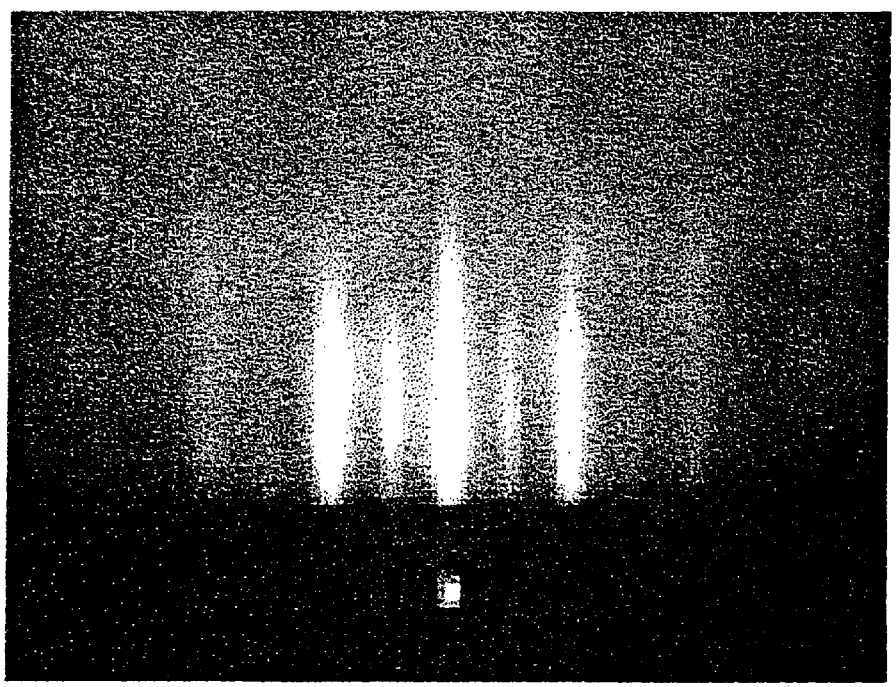
FIG. 4 is a reflection high-energy electron diffraction image of a cleaned GaAs (001) substrate surface.

A working example of a zincblende CrAs fabrication method will be set out. GaAs (001) with cleaned surface fabricated at 590–600° C. was used as the substrate. A reflection high-energy electron diffraction image of the cleaned surface is shown in FIG. 4. The incidence angle of the electron beam was [110]. A zincblende diffraction pattern is seen.

Figure 5:
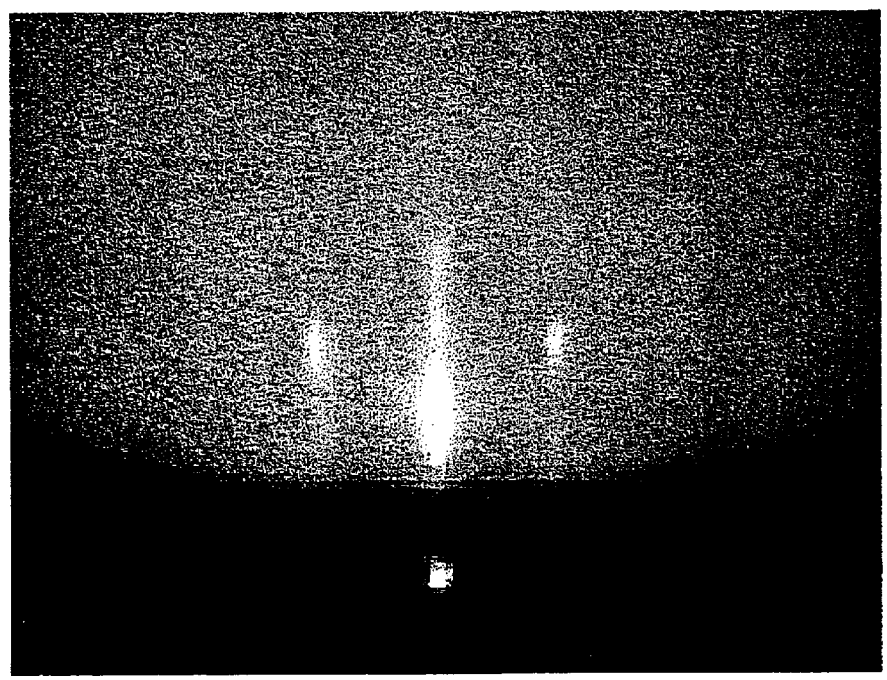
FIG. 5 is a reflection high-energy electron diffraction image of zincblende CrAs on a substrate.

After fabrication of the cleaned surface, the substrate was cooled down to a temperature of 200–300° C. Cr and As were then simultaneously deposited on its surface to grow a zincblende CrAs thin film thereon. A reflection high-energy electron diffraction image of the thin film surface is shown in FIG. 5. The incidence angle of the electron beam was [110] of the GaAs direction. It can be seen that the zincblende diffraction pattern was passed on to the thin film without modification. The Cr and $As_4$ molecular beam equivalent pressures of the nude ion gauge at this time were $2 \times 10^{-9}$ torr and $7 \times 10^{-6}$ torr. A GaAs cap layer was fabricated on the zincblende CrAs to prevent oxidation.

The crystal structure of the specimen (zincblende CrAs) fabricated in this manner was examined and its magnetic properties evaluated.

Figure 6:
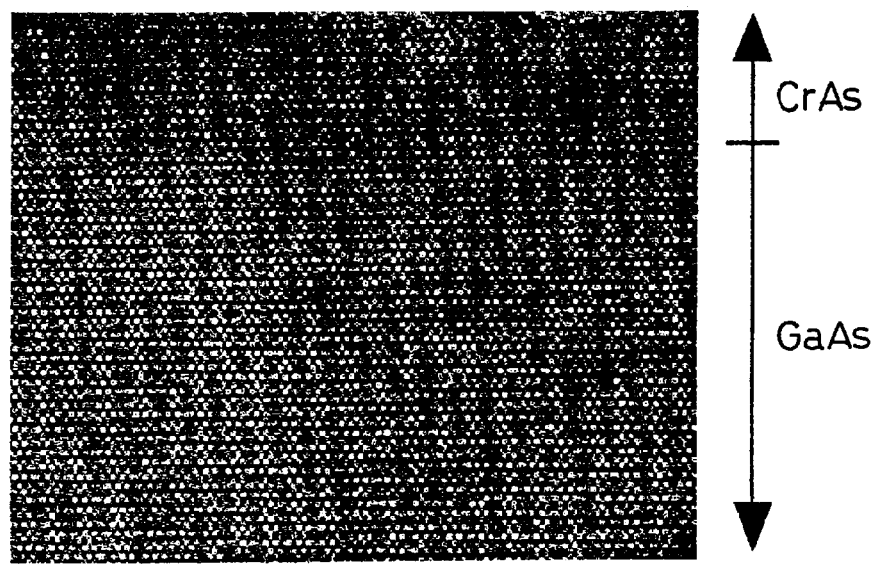
FIG. 6 is a cross-sectional transmission electron micrograph of a fabricated zincblende CrAs layer.

FIG. 6 is a cross-sectional transmission electron micrograph of the fabricated zincblende CrAs layer, shown above, together with the GaAs substrate, shown below. A crystal lattice image like that of the lower GaAs substrate was also observed at the upper region, confirming that the grown CrAs had the zincblende crystal structure on the GaAs substrate, thereby producing a heterostructure. No property-degrading byproducts appeared during the fabrication of the heterostructure.

Figure 7:
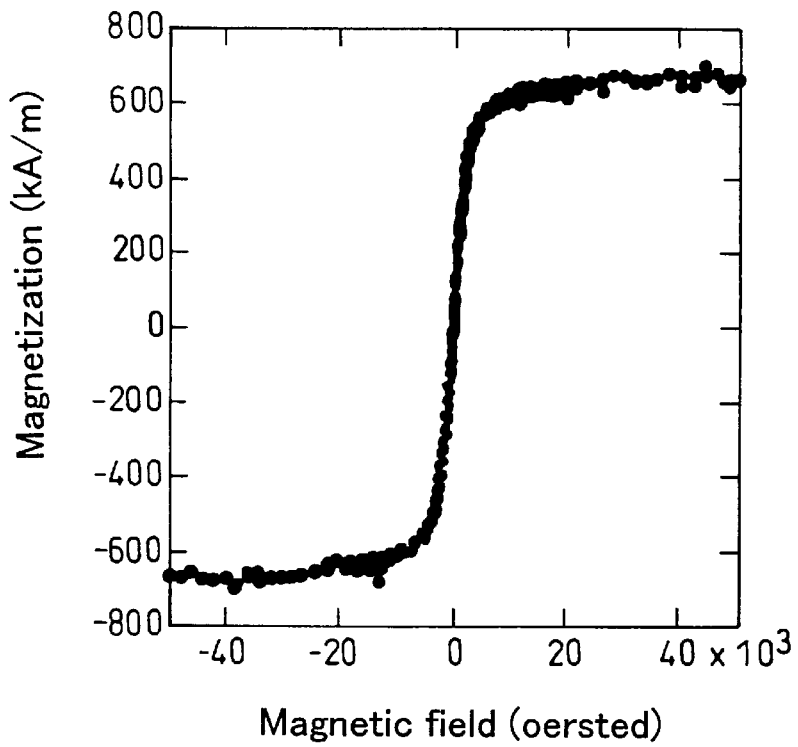
FIG. 7 is a graph showing a magnetization curve of fabricated zincblende CrAs.

FIG. 7 is a graph showing the magnetization curve of the fabricated specimen (zincblende CrAs.) The magnetic curve measurement was carried out at room temperature (300 K). The curve shows how magnetization increases with application of magnetic field. The moment per unit CrAs derived from this magnetization curve is approximately 3 Bohr magneton, the value expected for zincblende CrAs from theoretical calculation.

Figure 8:
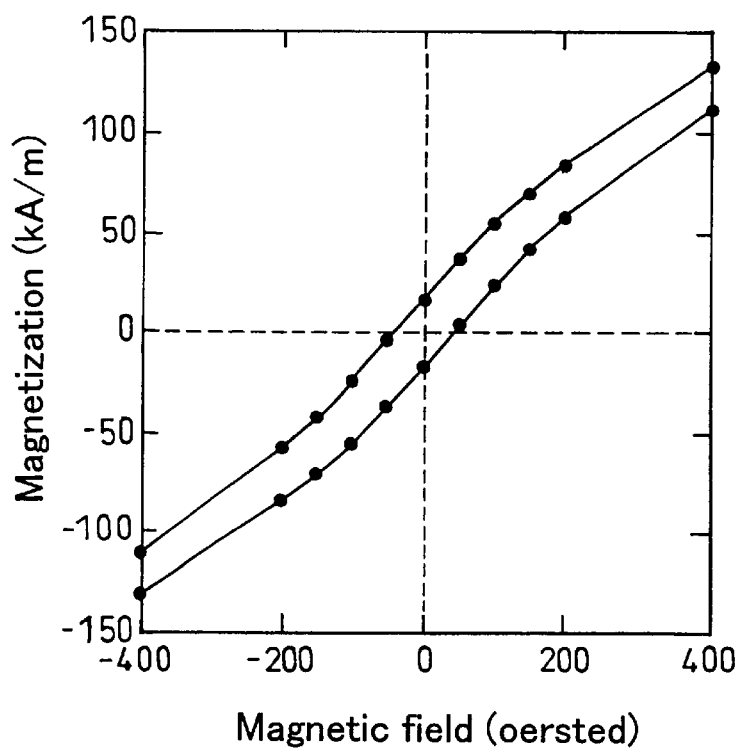
FIG. 8 is a zoomed view of the part of the magnetization curve of FIG. 7 in the vicinity of zero magnetic field.

FIG. 8 is an enlarged view of the part of the magnetization curve of FIG. 7 in the vicinity of zero magnetic field. As shown in this enlarged view of the region around zero magnetic field, remnant magnetism is present even when the magnetic field is made zero, clearly indicating the property of a ferromagnetic material.

Figure 9:
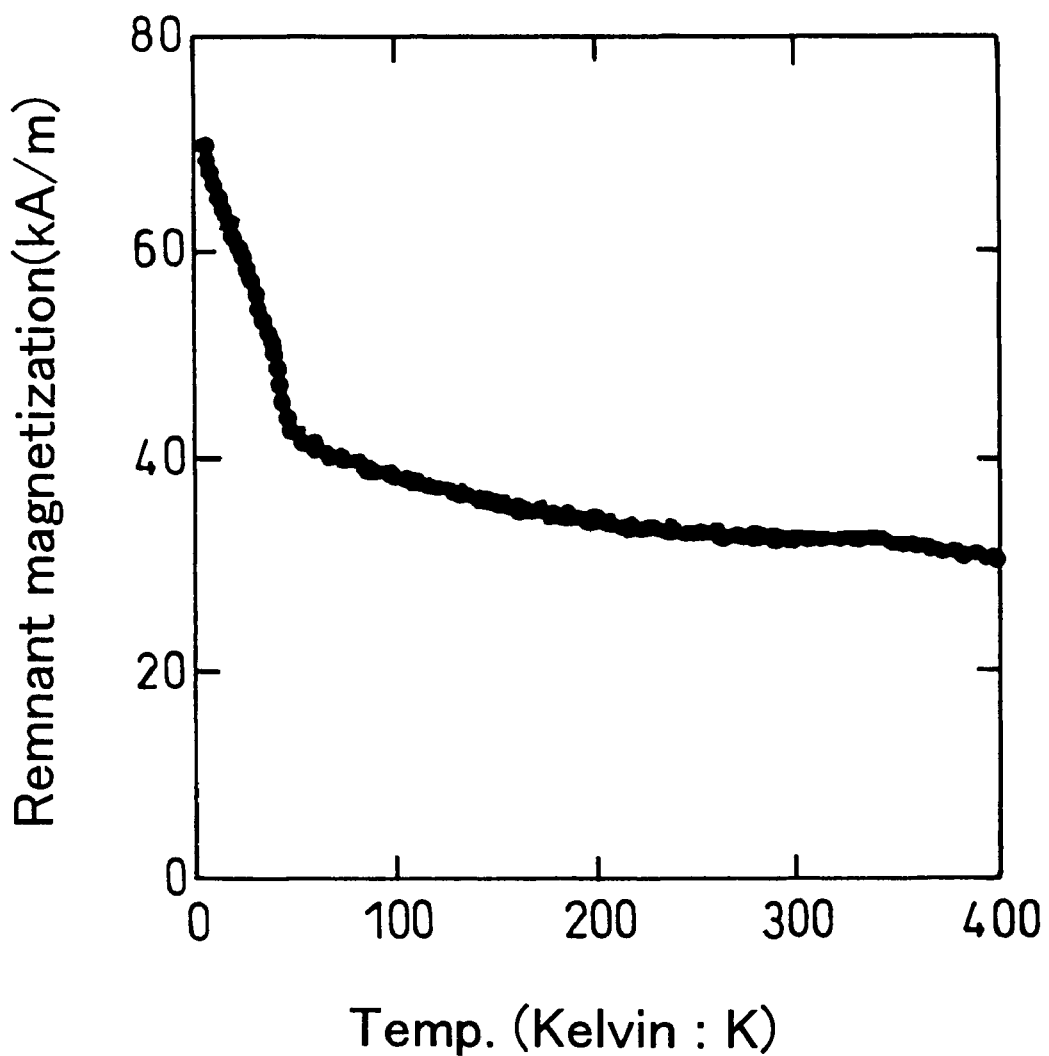
FIG. 9 is a graph showing the temperature dependence of the remnant magnetization of fabricated zincblende CrAs.

FIG. 9 is a graph showing the temperature dependence of the remnant magnetization of the fabricated specimen. Practically speaking, the temperature at which remnant magnetization becomes zero can be considered to correspond to the ferromagnetic transition temperature. Although the curve stops at 400 K because the measuring instrument did not permit analysis at higher temperatures, the graph demonstrates that the ferromagnetic transition temperature is definitely higher than 400 K. It can therefore be seen that a markedly high ferromagnetic transition temperature was achieved. The fabricated specimen exhibited a ferromagnetic transition temperature higher than room temperature (300 K) and thus had properties that made it fully adequate for use as a practical material. These findings also demonstrate that the substance is a different one from the ferromagnetic Cr—As compound of unknown crystal structure reported as the high-order Cr—As compound through the previous studies.

A method of fabricating a zincblende compound in the case where TE is Cr was explained in the foregoing. However, the fact that the calculation results shown in FIGS. 2 and 3 indicate that the no great difference in lattice constant etc. exits between the case where TE is Cr and the case where it is V or Mn leads to the conclusion that the fabrication method can also be applied under substantially the same conditions to a V or Mn zincblende compound As explained in the foregoing, the spin electronic material and fabrication method according to this invention enable realization of a zincblende TE-VE compound of the same crystal structure as that of GaAs or other such semiconductor electronic material. The TE-VE compound exhibits, as material properties, transition temperature in or exceeding the normal room temperature range and high degree of spin polarization, and has compatibility with existing semiconductor electronic materials such as to enable sharing of common fabrication processes, fabrication of heterostructures and avoidance of the formation of byproducts that cause property degradation during heterostructure fabrication. These outstanding properties characterize the TE-VE compound as a revolutionary new substance that embodies many properties desired in conventional spin electronic materials.

The spin electronic material according to this invention can be expected to find extensive use as a basic material for realizing next-generation information technologies (IT) that utilize spin-polarized electrons to conduct data transmission, recording and processing.

What is claimed is:

1. A spin electronic material exhibiting a spin-dependent electronic effect, which material comprises zincblende TE-VE, where TE stands for V or Cr and VE stands for As or Sb.

2. A spin electronic material exhibiting a spin-dependent electronic effect, which material comprises zincblende TE-VE, where TE stands for V or Cr and
   VE stands for As or Sb, and a zincblende Group III-V semiconductor of GaAs, AlAs, InAs, GaSb, AlSb, InSb or a mixed crystal thereof.

3. A spin electronic material exhibiting a spin-dependent electronic effect and enabling control of degree of spin polarization, intensity and anisotropy of magnetism, and ferromagnetic transition temperature, which material comprises a mixed V crystal of TE-VE, where TE stands for V, Cr or Mn and VE stands for As or Sb, and a different zincblende TE*-VE* represented by $TE_{1-x}TE^*_x\text{-}VE_{1-y}\text{-}VE^*_y$ (where $0 \leq x \leq 1$, $0 \leq y \leq 1$, TE* is V, Cr or Mn and different from TE, and VE* is As or Sb and different from VE).

4. A spin electronic material exhibiting a spin-dependent electronic effect and enabling control of degree of spin polarization, intensity and anisotropy of magnetism, and ferromagnetic transition temperature, which material comprises multilayers of zincblende TE-VE, where TE stands for V or Cr and VE stands for As or Sb, and a zincblende Group III-V, semiconductor of GaAs, AlAs, InAs, GaSb, AlSb, InSb or a mixed crystal thereof represented by $\{[TE\text{-}VE] \times D1/[III\text{-}V] \times d2\} \times N$ (where [TE-VE] stands for zincblende Group III-V semiconductor, d1 for thickness of the zincblende TE-VE, d2 for thickness of the semiconductor and N for repetition period).

5. A spin electronic material exhibiting a spin-dependent electronic effect according to claim 1, wherein the zincblende TE-VE further comprises at least one element selected from the group consisting of Li, Be, B, C, N, O, P, Na, Mg, Al, Si, P, S, Cl, K, Ca, Sc, Ti, Fe, Co, Ni, Cu, Zn, Ga, Ge, Se, Br, Rb, Sr, Y, Zr, Nb, Mo, Ru, Rh, Pd, Ag, Cd, In, Sn, Te, I, Cs, Ba, La, Hf, Ta, W, Re, Os, Ir, Pt, Au, Hg, Ti, Pb and Bi, whereby the spin electronic material enables control of degree of spin polarization, intensity and anisotropy of magnetism, and ferromagnetic transition temperature.

6. A spin electronic material exhibiting a spin-dependent electronic effect according to claim 2, wherein the zincblende TE-VE further comprises at least one element selected from the group consisting of Li, Be, B, C, N, O, P, Na, Mg, Al, Si, P, S, Cl, K, Ca, Sc, Ti, Fe, Co, Ni, Cu, Zn, Ga, Ge, Se, Br, Rb, Sr, Y, Zr, Nb, Mo, Ru, Rh, Pd, Ag, Cd, In, Sn, Te, I, Cs, Ba, La, Hf, Ta, W, Re, Os, Ir, Pt, Au, Hg, Ti, Pb and Bi, whereby the spin electronic material enables control of degree of spin polarization, intensity and anisotropy of magnetism, and ferromagnetic transition temperature.

7. A spin electronic material exhibiting a spin-dependent electronic effect and enabling control of degree of spin polarization, intensity and anisotropy of magnetism, and ferromagnetic transition temperature according to claim 3, wherein the zincblende TE-VE further comprises at least one element selected from the group consisting of Li, Be, B, C, N, O, P, Na, Mg, Al, Si, P, S, Cl, K, Ca, Sc, Ti, Fe, Co, Ni, Cu, Zn, Ga, Ge, Se, Br, Rb, Sr, Y, Zr, Nb, Mo, Ru, Rh, Pd, Ag, Cd, In, Sn, Te, I, Cs, Ba, La, Hf, Ta, W, Re, Os, Ir, Pt, Au, Hg, Ti, Pb and Bi.

8. A spin electronic material exhibiting a spin-dependent electronic effect and enabling control of degree of spin polarization, intensity and anisotropy of magnetism, and ferromagnetic transition temperature according to claim 4, wherein the zincblende TE-VE further comprises at least one element selected from the group consisting consisting of Li, Be, B, C, N, O, P, Na, Mg, Al, Si, P, S, Cl, K, Ca, Sc, Ti, Fe, Co, Ni, Cu, Zn, Ga, Ge, Se, Br, Rb, Sr, Y, Zr, Nb, Mo, Ru, Rh, Pd, Ag, Cd, In, Sn, Te, I, Cs, Ba, La, Hf, Ta, W, Re, Os, Ir, Pt, Au, Hg, TI, Pb and Bi.

9. A method of fabricating a spin electronic material exhibiting a spin-dependent electronic effect according to claim 1 comprising the steps of:

retaining a substrate of zincblende semiconductor electronic material at a temperature not exceeding 400° C.; and using a non-thermal equilibrium gas phase growth process to deposit TE-VE, where TB stands for V or Cr and VE stands for As or Sb, simultaneously on the substrate.

10. A method of fabricating a spin electronic material according to claim 9, wherein the substrate is formed of zincblende GaAs.

11. A method of fabricating a spin electronic material according to claim 9, wherein the TE, when deposited, has a molecular beam equivalent pressure set lower than a VE molecular beam equivalent pressure.

12. A spin electronic material made by the process of claim 9.

13. A method of fabricating a spin electronic material exhibiting a spin-dependent electronic effect according to claim 2 comprising the steps of:

retaining a substrate of zincblende semiconductor electronic material at a temperature not exceeding 400° C.; and using a non-thermal equilibrium gas phase growth process to deposit TE-VE, where TE stands for V or Cr and VE stands for As or Sb, simultaneously on the substrate.

14. A spin electronic material made by the process of claim 13.

15. A method of fabricating a spin electronic material exhibiting a spin-dependent electronic effect according to claim 3 comprising the steps of:

retaining a substrate of zincblende semiconductor electronic material at a temperature not exceeding 400° C.; and using a non-thermal equilibrium gas phase growth process to deposit TE-VE, where TE stands for V, Cr or Mn and VE stands for As or Sb, simultaneously on the substrate.

16. A spin electronic material made by the process of claim 15.

17. A method of fabricating a spin electronic material exhibiting a spin-dependent electronic effect according to claim 4 comprising the steps of:

retaining a substrate of zincblende semiconductor electronic material at a temperature not exceeding 400° C.; and using a non-thermal equilibrium gas phase growth process to deposit TE-VE, where TE stands for V or Cr and VE stands for As or Sb, simultaneously on the substrate.

18. A spin electronic material made by the process of claim 17.

* * * * *